March 26, 1940.  W. H. JACOB  2,195,214
FLUID BRAKE
Filed Sept. 1, 1938    2 Sheets-Sheet 1
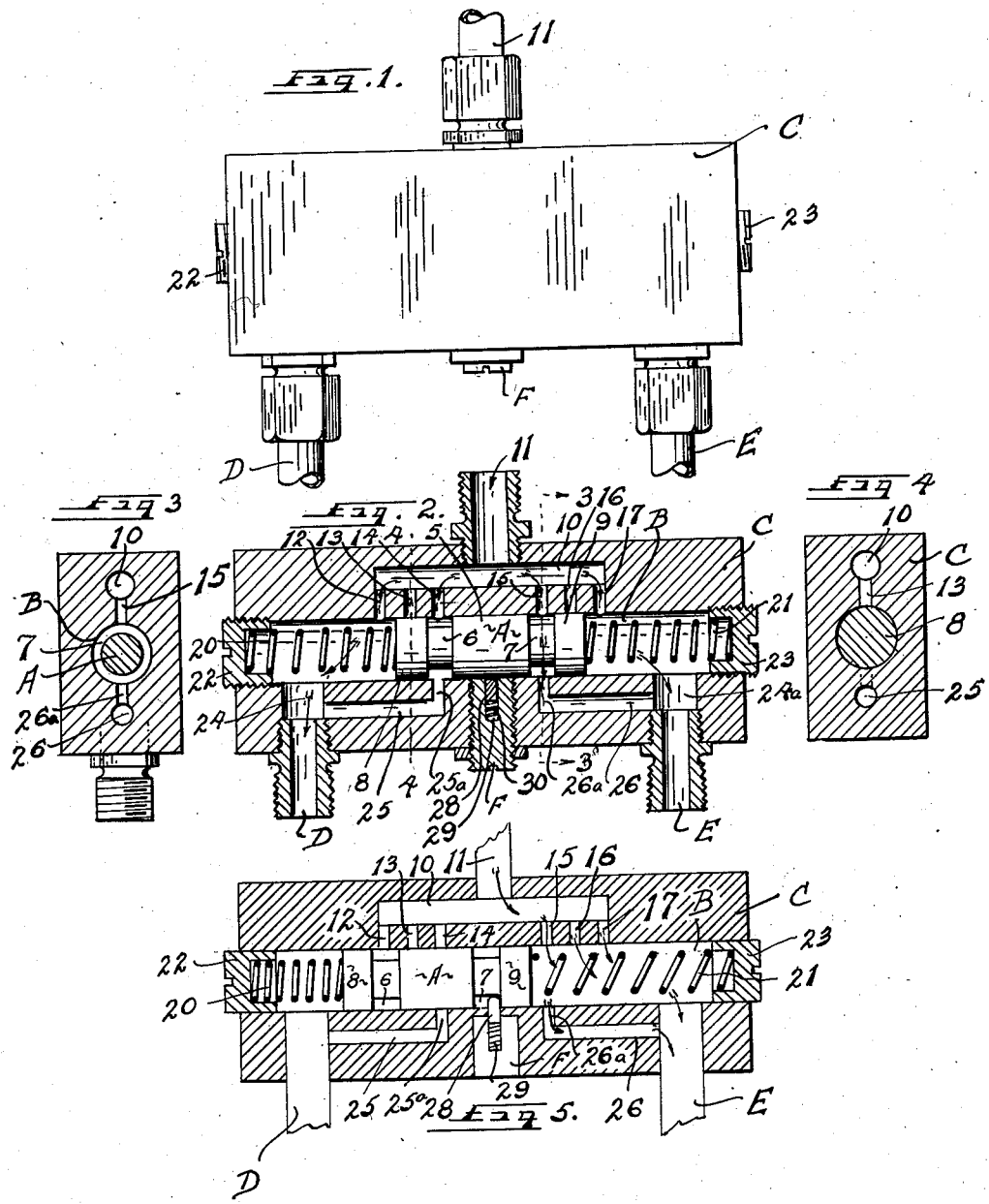
Inventor
William H. Jacob
By R. M. Thomas
Attorney March 26, 1940.  W. H. JACOB  2,195,214
FLUID BRAKE
Filed Sept. 1, 1938  2 Sheets-Sheet 2
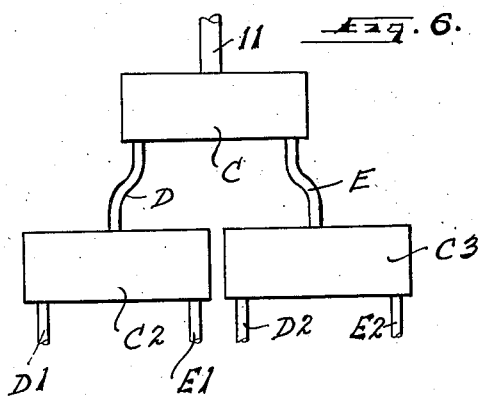
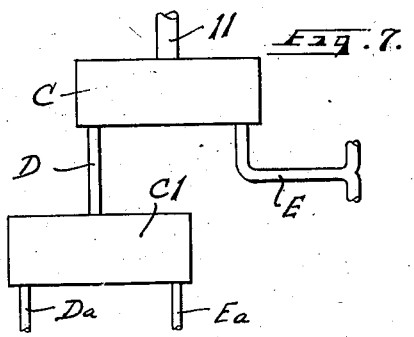
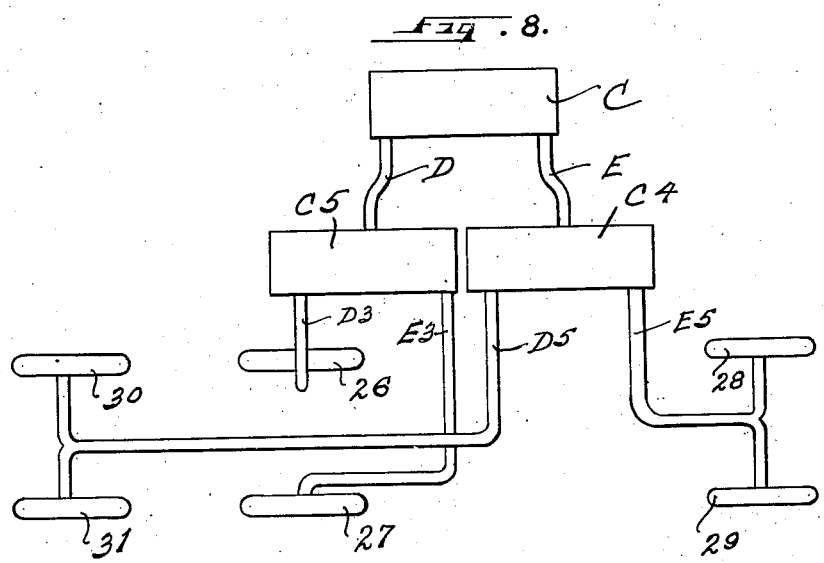
Inventor
William H. Jacob
By R. M. Thomas
Attorney Patented Mar. 26, 1940

2,195,214

UNITED STATES PATENT OFFICE 2,195,214

FLUID BRAKE

William H. Jacob, Helper, Utah, assignor of one-fourth to D. A. Walton, one-fourth to Verl Dastrup, both of Salt Lake City, Utah, and one-fourth to J. G. Wanner, Preston, Idaho Application September 1, 1938, Serial No. 227,997

3 Claims. (Cl. 303—84)

My invention relates to fluid brakes for motor vehicles and has for its object to provide a new and highly efficient means for cutting off any line in the fluid brake system, should such line develop a leak or be broken.

A further object is to provide an automatic shut off valve for fluid brake systems which will control various ports shutting off the flow of fluid through some ports, should there be a lessening or break in the pressure on that side of the valve.

A still further object is to provide a safety valve for large trucks, busses, etc., which will prevent their losing all of their brake system fluid should any one line be broken or develop a leak, keeping them with some supply of fluid for the other brakes. In large truck and trailer or semi-trailer jobs the system may be employed on both the truck and trailer, preventing many accidents through its use.

These objects I accomplish with the device illustrated in the accompanying drawings in which similar numerals and letters of reference indicate like parts throughout the several views and as described in the specification forming a part of this application and pointed out in the appended claims.

In the drawings I have shown

Figure 1 is a plan view of the master control valve for any brake system.

Figure 2 is a longitudinal section of Figure 1.

Figure 3 is a section on line 3—3 of Figure 2.

Figure 4 is a section on line 4—4 of Figure 2.

Figure 5 is a diagrammatic section showing the control valve piston moved to one control position due to break in the line leading from that end showing the relative position of the cylinder, piston valve ports and springs when one of the lines has developed a leak or been broken.

Figure 6 is a diagrammatic view of the control valve as used in series for a control of all four wheels separately.

Figure 7 is a diagrammatic view of the control valve in series with one other to control the front wheels with one line from the master valve and the rear wheels separately from another valve.

Figure 8 is a diagrammatic view showing the master control valve in series with dual valves for controlling the lines on truck and trailer jobs or like set ups where dual control valves are set up behind the master valve and one controls the front wheel brakes of the truck and the rear wheel brakes of the trailer and the other controls the separate drive wheels of the truck.

In the drawings I have shown the master control valve as a slidable piston A, mounted in a cylinder B, with a casing C. The piston A is made with a central piston body 5, annular grooves 6 and 7 at the end of said body and small spaced bodies 8 and 9 at each end thereof, all made in a single integral member.

Along one side of the cylinder B spaced therefrom is a distributing chamber or bore 10 into which the lead line 11 from the power cylinder (not shown) of the brake system is introduced. On the opposite side of the distributing bore 10 connecting it with the cylinder B there are two aligned spaced apart sets of three inlet ports, each set of ports 12, 13 and 14, leading into one end of the cylinder and the ports 15, 16 and 17, leading into the other end and the ports being so spaced that the two inner ports 14 and 15 lead into the chamber or cylinder B in alignment with the annular grooves 6 and 7 of the piston A when the piston is in the medial or central position for normal operation of the device and the two outside ports 12 and 17 lead into the chamber B beyond each end of the piston A. Thus fluid from the master cylinder enters the chamber or cylinder B. To normally hold the piston A centrally spaced in the cylinder B the end of the chamber or cylinder carry coil springs 20 and 21, set in receiver and closure plugs 22 and 23. These plugs do double duty being to close the ends of the cylinder B and act as cylinder heads and at the same time to hold the tension springs 20 and 21 in place. The outlet from each end of the cylinder B is into the brake lines D and E. These lines are screwed into discharge ports 24 and 24a formed in the opposite side of the cylinder from the inlet ports, and collecting chamber bores 25 and 26 are formed in the casing C parallel to the cylinder B with a port 25a and port 26a connecting the end of the two chambers with the cylinder B directly opposite to the ports 14 and 15 thus, the fluid entering the cylinder B through these later ports will travel around the annular grooves 6 and 7 of the piston and out through the ports 25a and 26a into the two bores and out to the brake lines.

The fluid from the other two ports 12 and 17 will enter the chamber or cylinder B and pass out through the ports 23 and 24 into the lines D and E. The lines D and E may be hooked up to separate brake cylinders as desired with other modifications being shown on Sheet 2 of the drawings and described hereinafter. As a safety locking means for holding the piston A in one end or the other of the cylinder when a line has been broken or developed a leak, I provide a plug F screwed into a threaded hole in the side of the casing C medially thereof and this plug F carries a spring controlled plunger rod 28 in a bore 29 with the spring 30 normally pressing against the inner end of said plunger rod to hold it against the side of the piston A but, when one line breaks the force of the spring augmented by the lack of pressure in the opposite side of the piston A, and the force of the fluid will force the piston toward the end of the cylinder which controls the discharge to the broken line and the plunger rod 28 will drop the annular grooves 6 and 7 depending on the direction of travel of the piston, as shown in Figure 5, the plunger rod has dropped or been forced into the groove 7. This locks off the line until required, and the plug F removed sufficient distance to allow the piston to resume its central position.

In Figures 6, 7 and 8 I have shown different diagrammatic views showing how the master control valve may be used with other like valves to control different types of systems required but I do not wish to limit myself to such hook ups as others may be made with equal success.

It will be obvious that one valve may be used with the power cylinder of the brake system connected to the line 11 and with the line connected to the two rear brakes and the line E connected to the front brakes and in Figure 7 the line D is connected to another valve casing C1, and the line E is connected to the front brakes. The casing C1 is connected to the rear brake cylinders by lines Da and Ea. This makes it so that if one of the front lines breaks, the two rear wheels will be actuated and even if one of the rear lines breaks, there will be a brake on one rear wheel. This same system may be employed for a car and trailer hook up.

In Figure 6 the master casing C is shown, connected to a casing C2 for the front brakes and C3 for the rear brakes. The lines D and E in Figure 6 show connecting the master casing C to the other casings C2 and C3 and the lines D1 and E1 leading from the casing C2 are directed to the front brakes and the lines D2 and E2 lead to the rear brakes each brake cylinder being connected independently.

Figure 8 shows the casing C connected to two casings C4 and C5, and the casing C5 is connected by lines D3 and E3 to the two rear brakes 26 and 27 of the truck, while the casing C4 is connected to lines D5 and E5 with the line E5 leading to the front wheels 28 and 29 and the line D5 leading to the two rear wheels 30 and 31 of a semi-trailer.

Having thus described my invention, I desire to secure by Letters Patent and claim:

1. A safety device for hydraulic brakes comprising a casing having a cylindrical chamber therein; a piston carried in said cylinder, said piston carrying annular grooves near each end thereof; a lead line from the master cylinder of the brake system; spaced apart lines leading from the opposite side of said cylinder to carry the fluid to the brakes; spaced apart sets of ports leading from the inlet lead line to the cylinder; and spaced apart pairs of outlet ports leading from the cylinder to the spaced apart lead lines, said ports being so arranged that in normal operation two of said pairs of inlet ports are directed into communication with the outlet ports through said cylinder, one passing into annular grooves of the piston and into an outlet port; springs carried in each end of said cylinder to force the piston in one direction or the other, should the pressure in either outlet line decrease from a leaky or broken line; and a spring controlled locking plunger carried in the side wall of said cylinder to engage one of said grooves when the piston has traveled sufficient distance to permit entrance thereinto by said plunger.

2. A device as set out in claim 1 including a multiplicity of said cylinders and piston in series to control various fluid lead lines independently.

3. A control for hydraulic brakes comprising, an elongated piston carried in a cylinder and held in medial position by the normal force of the fluid in the brake system; said piston having annular grooves therearound near each end thereof; a fluid pressure line entering one side of said cylinder and divided into spaced apart ports to direct the fluid beyond the ends of the piston in normal operation and through the annular grooves; means to force said piston to either end of the cylinder upon breakage of either of the outlet lines from the cylinder; and means to permanently lock said piston when so moved until the line has been repaired and the piston is manually reset.

WILLIAM H. JACOB.